Feb. 11, 1964   R. C. MILDNER   3,121,136
CO-AXIAL CABLE HAVING INNER AND OUTER CONDUCTORS
CORRUGATED HELICALLY IN OPPOSITE DIRECTIONS
Filed June 30, 1961

INVENTOR.
RAYMOND CHARLES MILDNER

BY
ATTORNEY

United States Patent Office 3,121,136
Patented Feb. 11, 1964

3,121,136
CO-AXIAL CABLE HAVING INNER AND OUTER CONDUCTORS CORRUGATED HELICALLY IN OPPOSITE DIRECTIONS
Raymond Charles Mildner, 904 Crescent Drive, Midland, Mich.
Filed June 30, 1961, Ser. No. 121,130
Claims priority, application Great Britain July 4, 1960
2 Claims. (Cl. 174—28)

This invention relates to co-axial cables designed to transmit currents of a frequency of about 1 megacycle per second or higher, and is concerned with air spaced co-axial cables designed to transmit high power or to operate over a substantial range of temperature.

In order to achieve a high efficiency of transmission with a co-axial cable, so that as little as possible of the power to be transmitted along the cable is wasted, it is desirable that the minimum amount of solid material should be used in the insulating structure which separates the two conductors. A limiting factor is the ability of this insulation to withstand the mechanical stresses imposed during handling of the cable and to resist the forces exerted by the differential expansion of the two conductors when the cable passes through temperature cycles, whether due to atmospheric or ambient conditions, or due to the electrical load transmitted by the cable.

The return conductor of an air-spaced co-axial cable is usually a tube which provides an hermetic seal against the ingress of moisture to the insulation, and the tube is usually made of aluminium, copper or lead.

It has been proposed helically to corrugate the return conductor or tube of this class of cable in order to ease the problems of handling and installation.

According to the present invention there is provided an air-spaced co-axial cable comprising an inner tubular corrugated conductor, an outer tubular corrugated conductor, at least one of the conductors being helically corrugated, and insulating material affording air spaces extending between the conductors longitudinally of the cable, the insulation material engaging against the crests of the corrugations on the inner conductor and against the troughs of the corrugations on the outer conductor.

Although the terms "crests" and "troughs" are, of course, relative terms as applied to corrugated materials, it is to be appreciated that the crests of the corrugations on the inner conductor constitute the outer extremities of the inner tubular conductor, and that likewise the troughs of the corrugations on the outer conductor constitute the inner extremities of the outer tubular conductor.

It is desirable to use a corrugated tubular inner conductor in cases where the cable is subjected to severe temperature cycles, because the return conductor is normally restrained against free movement, whether it is clamped to a mast, buried in the ground or suspended above the ground, and the forces on the insulating structure due to differential thermal expansion of the two conductors may be very high if the modulus of elasticity of the inner conductor is high.

If two helical constructions of differing pitch are used in a cable, the reaction between these two helices will cause a periodic change in the electrical characteristics of the cable along its length, and in particular a periodic change in its local characteristic impedance. This effect will normally make the cable unusuable at a frequency where the electrical length of this interference is about one half-wavelength and also usually at multiples of this frequency. The practical importance of this effect can be reduced, according to a further feature of the invention, by applying the two helices with opposite hands, so that the length between periodic interferences is reduced and the electrical effect is transferred to very high frequencies beyond the desired range of operation.

Since, according to this further feature of the invention the helical corrugations of the inner and outer conductors are of opposite hands, it is not feasible to employ a helical form of insulating structure, and it is necessary to employ an insulating structure which extends longitudinally of the cable and which rests on the crests of the corrugations on the inner conductor and on the troughs of the corrugations of the outer conductor. Such insulation may be in the form of a layer of insulating tubes arranged around the inner conductor, or synthetic plastic material extruded into cartwheel cross-section. A preferred form of insulation is that described in my co-pending patent application Serial No. 121,129 which consists of a plurality of arcuate members with their central portions engaging and substantially tangential to the inner conductor and their edges engaging and substantially radial to the outer conductor, the members abutting one another at least in the region near their edges and being preferably joined at their edges. If desired, the members may have corrugations extending longitudinally thereof and of small amplitude so as to reduce the effective modulus of the member.

It has been found that, because of random variations of the cable dimensions around the designed figures, the transmission characteristics of the cable may be impaired at frequencies somewhat lower than that for which periodic changes are a half of a wave length, although their maximum effect is found at this frequency. It is therefore desirable to set this condition at a frequency as high as possible, preferably at least twice the operating frequency. The smaller pitch $l_1$ of the two conductor corrugations should therefore be limited to a maximum of one inch. Furthermore, since points of contact between a longitudinally extending insulating structure consisting of a plurality of arcuate members or tubes and the corrugated conductors cause periodic changes of local capacitance, it is desirable that the quotient:

$$\frac{l_2}{n}$$

should be less than one inch, where $l_2$ is the corrugation pitch of the other conductor in inches and $n$ is the number of arcuate or circular air spaces defined by the insulating structure.

In order to enable the invention to be more readily understood, reference will now be made to the accompanying drawings which illustrate diagrammatically and by way of example an embodiment thereof and in which.

Figure 1:
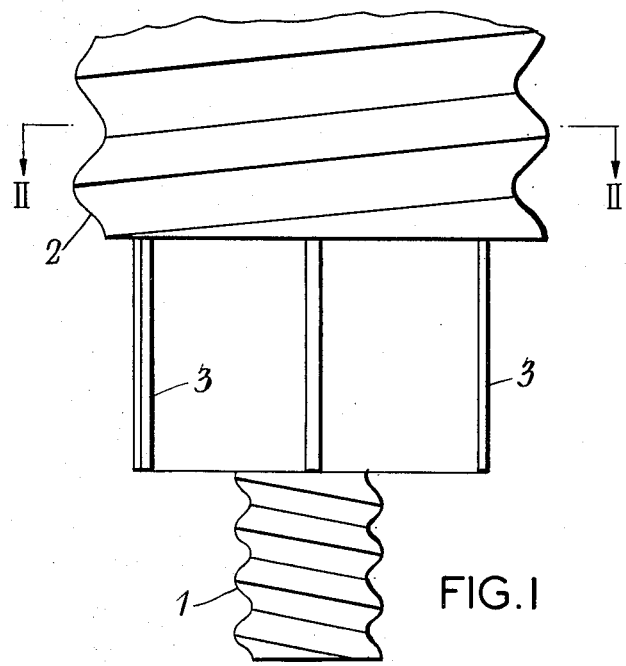
FIG. 1 is a cut-away section of part of the co-axial cable.

Referring now to the drawings there is shown a co-axial cable comprising a go or inner conductor 1 and a return or outer conductor 2. The inner and outer conductors are tubular and corrugated, and are desirably constructed in the manner described in my co-pending patent application Serial No. 121,128. Between the inner conductor 1 and the outer conductor 2 there is provided insulation in the form of a plurality of arcuate substantially U-section members 3 of which the central portions engage against and lie substantially tangential to the inner conductor 1 while the edges lie substantially radial to the outer conductor. One edge of each member 3 is bent over as at 4 to cover the adjacent abutting edge of the adjacent member so as to join the members.

Figure 2:
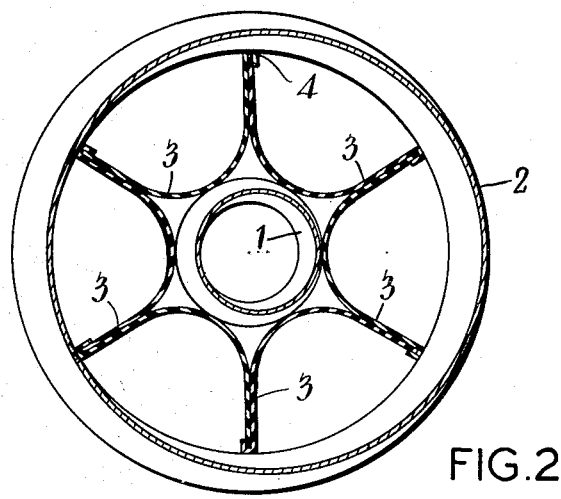
FIG. 2 is a cross-section along the line II—II in FIG. 1.

As will be seen from FIG. 2, the arcuate insulating members 3 engage against the crests of the corrugations of the inner conductor 1 and against the troughs of the corrugations of the outer conductor 2. As shown in FIG. 1, the outer and inner conductors are helically corrugated and the helical corrugations of the inner and outer conductors are of opposite hands in order to reduce the reaction between the two helices. The pitch $l_1$ of the corrugations of the inner conductor 1 is chosen to have a value of not more than one inch, and the pitch $l_2$ of the corrugations on the outer conductor 2 is chosen to be not more than six inches so that the quotient $$\frac{l_2}{n}$$

where $n$ equals the number of arcuate air spaces defined between the insulating members 3 and the outer conductor 2, i.e. six, is less than 1 inch.

Having thus described the invention, what is claimed as new and desired to be secured by Letters Patent, is:

1. An air spaced coaxial cable comprising an inner tubular helically corrugated conductor, an outer tubular helically corrugated conductor, the helical corrugations of the inner and outer conductors being of opposite hands, and a plurality of arcuate members made of synthetic plastic material so arranged that their central portions engage against the crests of the corrugations on the inner conductor and lie substantially tangential to the inner conductor and so that their edges lie substantially radial to the outer conductor and engage against the troughs of the corrugations on the outer conductor, the members abutting one another at least in the region near their edges and affording air spaces extending between the conductors longitudinally of the cable.

2. A cable as claimed in claim 1, wherein the smaller pitch of the two conductor corrugations has a maximum of one inch, and wherein the quotient of the pitch, expressed in inches, of the corrugations of the other conductor divided by the number of arcuate air spaces defined between the arcuate members and the outer conductor is less than one inch.

References Cited in the file of this patent

UNITED STATES PATENTS

| | | |
|---|---|---|
| 252,634 | Waring | Jan. 24, 1882 |
| 1,781,124 | Nein | Nov. 11, 1930 |
| 1,978,418 | Dudley | Oct. 30, 1934 |
| 2,998,472 | Bondon | Aug. 29, 1961 |

FOREIGN PATENTS

| | | |
|---|---|---|
| 494,695 | Great Britain | Oct. 31, 1938 |
| 932,619 | Germany | Sept. 5, 1955 |